United States Patent
Murakami et al.

(10) Patent No.: US 11,020,851 B2
(45) Date of Patent: Jun. 1, 2021

(54) ROBOT AND BAG USED FOR THE ROBOT

(71) Applicant: KAWASAKI JUKOGYO KABUSHIKI KAISHA, Kobe (JP)

(72) Inventors: Junichi Murakami, Kobe (JP); Takuma Uchida, Kakogawa (JP); Manabu Kajiura, Himeji (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/467,656

(22) PCT Filed: Dec. 6, 2017

(86) PCT No.: PCT/JP2017/043836
§ 371 (c)(1),
(2) Date: Jun. 7, 2019

(87) PCT Pub. No.: WO2018/105661
PCT Pub. Date: Jun. 14, 2018

(65) Prior Publication Data
US 2020/0070336 A1    Mar. 5, 2020

(30) Foreign Application Priority Data
Dec. 7, 2016  (JP) .............................. JP2016-237215

(51) Int. Cl.
*B25J 9/00* (2006.01)
*A22C 17/00* (2006.01)

(52) U.S. Cl.
CPC ............. *B25J 9/0009* (2013.01); *A22C 17/00* (2013.01)

(58) Field of Classification Search
CPC ............................ B25J 9/0009; A22C 17/00
See application file for complete search history.

(56) References Cited

U.S. PATENT DOCUMENTS

| | | | | |
|---|---|---|---|---|
| 3,698,791 A | * | 10/1972 | Walchle ................ | A61B 90/50 359/510 |
| 8,740,881 B2 | * | 6/2014 | Ortmaier .............. | B25J 19/0075 606/1 |
| 9,822,922 B2 | * | 11/2017 | Doi ...................... | F16M 11/048 |
| 2010/0292707 A1 | | 11/2010 | Ortmaier et al. | |
| 2014/0031978 A1 | * | 1/2014 | Takata .................. | A21C 9/088 700/245 |
| 2015/0047647 A1 | * | 2/2015 | Winer ................... | A61B 46/00 128/854 |
| 2015/0202009 A1 | * | 7/2015 | Nussbaumer .......... | A61B 46/10 128/856 |
| 2020/0070336 A1 | * | 3/2020 | Murakami ............. | B25J 9/0009 |

FOREIGN PATENT DOCUMENTS

| | | | |
|---|---|---|---|
| EP | 0138461 A2 | | 4/1985 |
| JP | S62-63088 A | | 3/1987 |
| JP | H02-83192 A | | 3/1990 |
| JP | 2008-30186 A | | 2/2008 |
| JP | 2008030186 A | * | 2/2008 |
| JP | 2010-64219 A | | 3/2010 |
| JP | 2016-52700 A | | 4/2016 |
| WO | 2007/122717 A1 | | 11/2007 |

* cited by examiner

*Primary Examiner* — Vicky A Johnson
(74) *Attorney, Agent, or Firm* — Oliff PLC

(57) ABSTRACT

A robot includes a base, a robotic arm supported by the base, and a bag having flexibility configured to accommodate the robotic arm.

20 Claims, 8 Drawing Sheets

ROBOT AND BAG USED FOR THE ROBOT

TECHNICAL FIELD

The present disclosure relates to a robot and a bag used for the robot.

BACKGROUND ART

In recent years, it has been proposed in various fields that a robot and a worker work jointly in the same workspace in terms of an improvement of productivity. For example, at the meat processing site, slicing of meat using a meat slicer has been conventionally performed, but there is a problem that scrap meat generated during the slicing work scatters forward of the slicer and toward the worker. For this reason, according to the requirement of hygiene management, the work site is periodically cleaned with water for sterilization (for example, twice a day before and after the work). In such a work site, when introducing a humanoid work robot, the measures are needed to prevent the scattering scrap meat and the cleaning water from infiltrating into the robot main body.

Conventionally, there is a technology which covers an industrial robot, such as a painting robot, with a flexible bag for the purpose of dust and drip proof of the robot (refer to Patent Documents 1 and 2). Moreover, there is a technology which covers a joint part of a robot with a dust-proof covering (refer to Patent Document 3).

REFERENCE DOCUMENTS OF CONVENTIONAL ART

Patent Documents

[Patent Document 1] JP1987-063088A
[Patent Document 2] JP1990-083192U
[Patent Document 3] JP2010-064219A

DESCRIPTION OF THE DISCLOSURE

Problems to be Solved by the Disclosure

However, since the conventional robots are used for the industrial applications, such as painting, the robots are not designed for the scattering scrap meat and cleaning water. For this reason, if the robots are introduced into a food processing site with a severe hygiene management, the productivity may be reduced and therefore, there is room for a further improvement.

The present disclosure is made in order to solve the above problems, and one purpose thereof is to provide a robot which is capable of achieving both hygiene management and productivity improvement at a food processing site etc.

SUMMARY OF THE DISCLOSURE

In order to achieve the purpose, a robot according to one aspect of the present disclosure includes a base, a robotic arm supported by the base, and a bag having flexibility configured to accommodate the robotic arm.

According to this structure, by covering the robotic arm with the bag having flexibility, it can prevent that, for example, scrap meat and cleaning water infiltrate into the robot from the robotic arm when processing meat at a food processing site. Therefore, both hygiene management and productivity improvement can be achieved.

The robot may include an end effector coupled to a tip end of the robotic arm. The bag may include a main body configured to accommodate the robotic arm, and an opening formed at one end of the main body and configured to expose the end effector therethrough.

According to this structure, by forming the opening in the bag, the end effector at the tip end of the arm can be exposed from the opening. The washing of the end effector becomes easier.

The robotic arm may include a pair of robotic arms supported by the base, and the bag may be configured to accommodate each of the pair of robotic arms.

According to this structure, since the robot includes the pair of arms, it can perform a work jointly with a worker, in the same workspace such as the food processing site. Therefore, both the hygiene management and the productivity improvement can be achieved.

Each of the bags may include a main body configured to accommodate one of the robotic arms, an opening formed at one end of the main body and configured to expose an end effector coupled to a tip end of the one robotic arm, a first small opening formed at the other end of the main body and configured to expose the base, and a second small opening formed at the other end of the main body and configured to expose the other robotic arm.

According to this structure, by forming the opening at one end of each of the bag, the end effector at the tip end of the arm can be exposed, and by forming the first small opening and the second small opening, the base and the other arm can be exposed.

Each of the bags may further include an opening formed at the other end of the main body, and mutually-bindable binding parts provided to two separated locations on a circumferential edge of the opening. The first small opening and the second small opening may be formed by mutually binding the binding parts. Thus, the first small opening and the second small opening can be narrowed.

The base may include a base body and a leg coupled to the base body. The robot may further include a bag having a main body configured to accommodate the base body and an opening formed so as to expose the leg.

According to this structure, since the opening is formed in the bag which accommodates the base body of the robot, the leg can be exposed from the opening. The washing of the leg of the base becomes easier.

The bag may further include a member provided to an edge of the opening and configured to narrow the opening.

The bag may have a narrowing part formed in an edge of the opening to narrow the opening.

According to this structure, since the opening of the bag can be narrowed, it can prevent that foreign substance enters from gaps of the opening. The member may be, for example, a pair of strings provided to the circumferential edge of the opening or a string which is inserted through a though hole for the string formed in the circumferential edge of the opening. Attachment and detachment of the bag become easier.

The robot may further include a bag gripper provided to one or more locations in the robotic arm and configured to grip the bag from inside of the bag. Although, if the gap between the bag and the robotic arm is large, the bag may easily be damaged due to, for example, friction in association with the operation of the robotic arm, according to this structure, the bag can be closely contacted to the robotic arm and the bag becomes difficult to be damaged. The bag gripper may be a clip for stationery or a clothespin. Attachment and detachment of the bag become easier.

The bag may be colored in a specific color. According to this structure, even if the bag is torn by an operation of the robot and the torn fragment is mixed with food, they are easily found out visually. The robotic arm may have an articulated structure.

In the robot, the robotic arm may include a pair of robotic arms supported by the base. The robot may include end effectors coupled to tip ends of the respective robotic arms. The bag may include a main body configured to accommodate both the robotic arms, openings for hands formed at one end and the other end of the main body and configured to expose the end effectors, an opening for a torso configured to expose a part of the base, and fasteners provided between the opening for the torso and the openings for hands in the main body and configured to be openable and closable.

A bag according to another aspect of the present disclosure is a bag used for the robot.

Effect of the Disclosure

The present disclosure has the structure described above and can provide the robot capable of achieving both the hygiene management and the productivity improvement at a food processing site etc. The purpose, other purposes, features, and advantages of the present disclosure will become apparent from the following detailed description of suitable embodiments with reference to the accompanying drawings.

MODES FOR CARRYING OUT THE DISCLOSURE

Figure 1:
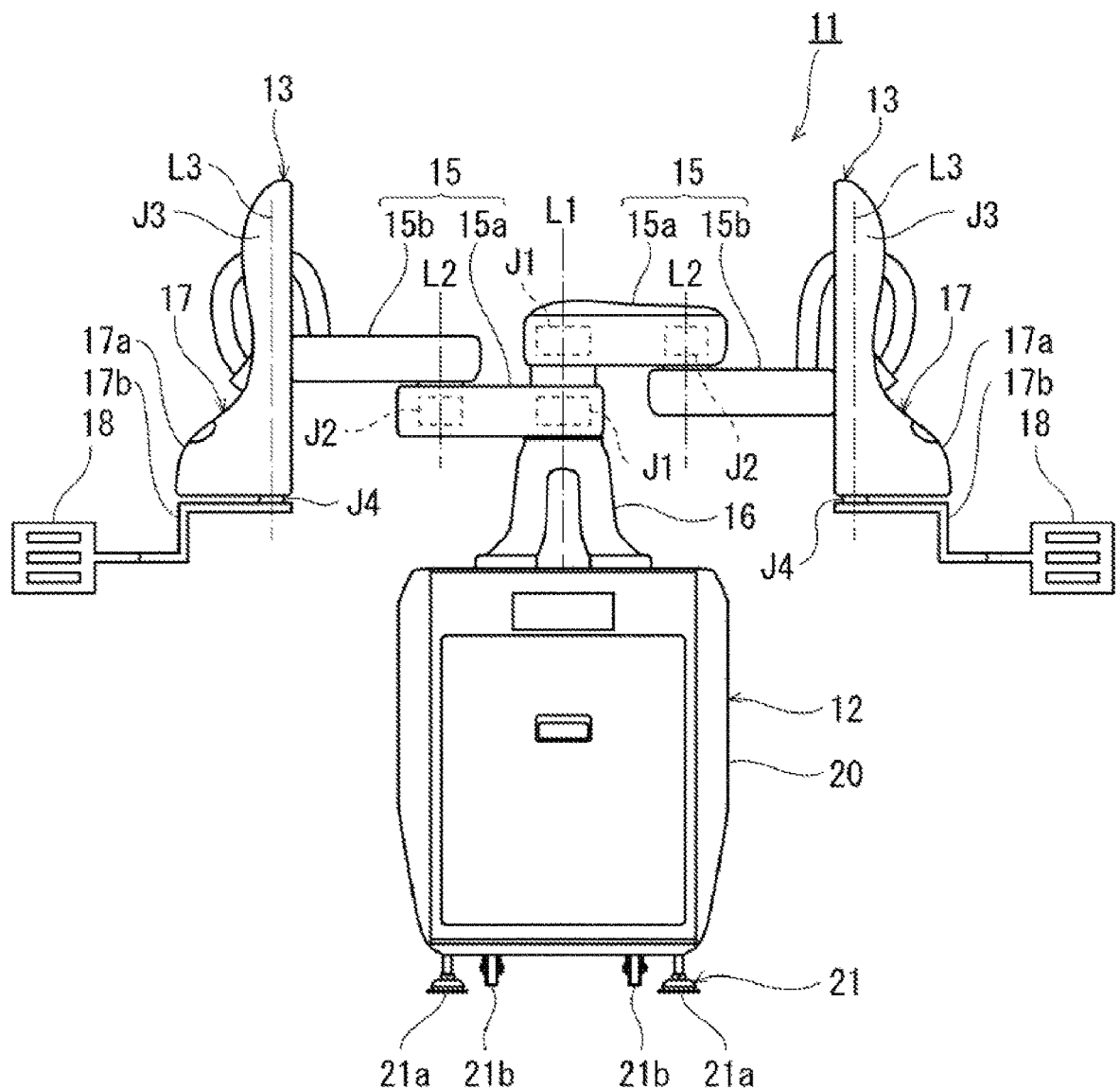
FIG. 1 is a front view schematically illustrating an entire structure of one example of a robot according to a first embodiment of the present disclosure.

Hereinafter, desirable embodiments will be described with reference to the drawings. Note that, in the following, the same reference characters are assigned to the same or corresponding elements throughout the drawings to omit redundant description. Moreover, the drawings schematically illustrate each element for easier understanding. Further, a direction in which a pair of arms are extended is referred to as a left-and-right direction, a direction parallel to an axial center of a base shaft is referred to as an up-and-down direction, and a direction perpendicular to the left-and-right direction and the up-and-down direction is referred to as a front-and-rear direction.

First Embodiment

A robot according to a first embodiment of the present disclosure is introduced into a meat processing site, and performs an extraction work of meat which is processed by a slicer for exclusive use (not illustrated) with a worker. FIG. 1 is a front view schematically illustrating the entire structure of one example of a robot 11. As illustrated in FIG. 1, the robot 11 includes a base 12, a pair of robotic arms (hereinafter, may simply be referred to as "the arm") 13 supported by the base 12, and a control device (not illustrated) accommodated in the base 12.

The base 12 includes a base body 20 and a leg 21 placed on a floor surface (not illustrated). The base body 20 has a casing of a substantially rectangular parallelepiped shape, and stores various units of the robot 11, such as a control device (not illustrated), inside the casing. The leg 21 is comprised of two fixed casters 21a and two free casters 21b, which are provided to a lower surface of the base body 20.

Each arm 13 is a horizontal articulated robotic arm constructed to be movable with respect to the base, and includes an arm part 15, a wrist part 17, and an end effector 18. Note that the right arm 13 and the left arm 13 may have substantially the same structure. Moreover, the right arm 13 and the left arm 13 can operate independently and/or can operate collaboratively.

In this example, the arm part 15 is comprised of a first link 15a and a second link 15b. The first link 15a is coupled to a base shaft (may also be referred to as a torso part of the robot) 16 fixed to an upper surface of the base 12 through a rotary joint J1, and is rotatable about a rotation axis L1 passing through an axial center of the base shaft 16. The second link 15b is coupled to a tip end of the first link 15a through the rotary joint J2, and is rotatable about a rotation axis L2 defined at a tip end of the first link 15a.

The wrist part 17 is comprised of an elevating part 17a and a rotary part 17b. The elevating part 17a is coupled to a tip end of the second link 15b through a linear-motion joint J3, and is capable of ascending and descending with respect to the second link 15b. The rotary part 17b is coupled to a lower end of the elevating part 17a through a rotary joint J4, and is rotatable about a rotation axis L3 defined at a lower end of the elevating part 17a.

The end effector 18 is coupled to the rotary part 17b of each wrist part 17. The end effector 18 is provided to a tip end of the arm 13. In this embodiment, the end effector 18 is a spatula for handling processed meat.

Each arm 13 of the above structure has joints J1-J4. The arm 13 is provided with driving servo motors (not illustrated) and encoders (not illustrated) which detect rotational angles of the servo motors, so as to be associated with the respective joints J1-J4. Moreover, the rotation axes L1 of the first links 15a of the two arms 13 are located coaxially, and the first link 15a of one of the arms 13 and the first link 15a of the other arm 13 are provided with a height difference.

At the meat processing site into which the robot 11 of this embodiment is introduced, there is a problem that scrap meat generated during a work scatters forward of a slicer and toward a worker. For this reason, according to the requirement of hygiene management, the work site is periodically cleaned with water for sterilization (for example, twice a day before and after the work). Therefore, the measures are necessary to prevent the scattering scrap meat and the cleaning water from infiltrating into the main body of the robot 11.

Figure 2A:
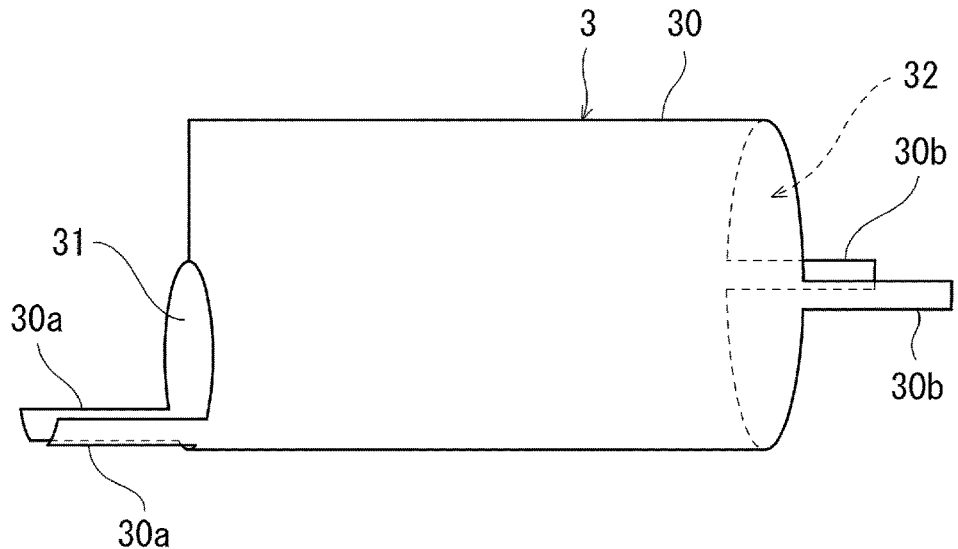
FIGS. 2(A) to 2(D) are views illustrating a structure of a bag which accommodates a robotic arm of FIG. 1.

Thus, the robot 11 of this embodiment includes bags which are constructed so as to accommodate the pair of arms 13. Note that the bag which accommodates the right arm 13 and the bag which accommodates the left arm 13 have substantially the same structure. FIG. 2(A) is a side view illustrating a structure of a bag 3 for the right arm 13. As illustrated in FIG. 2(A), the bag 3 includes a cylindrical main body 30, an opening 31 formed in one end of the main body 30, and an opening 32 formed in the other end of the main body 30.

The main body 30 is formed in a cylindrical shape. The length in a longitudinal direction of the main body 30 is a dimension corresponding to the length of the arm 13. One of the arms (right arm) 13 is accommodated in the main body 30. The main body 30 is made of material having flexibility, such as polyethylene, polyvinyl chloride, polyolefin, etc. Since these materials are inexpensive, the bag can be thrown away after use. The bag 3 is colored in blue.

Figure 2B:
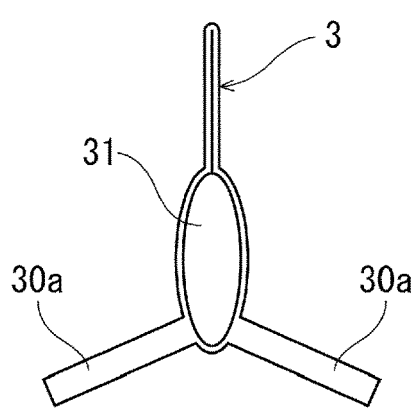

The opening 31 is formed by partially bonding an end of the cylindrical main body 30 and is constructed so as to expose the end effector 18 at the tip end of one of the arms (right arm) 13. That is, a diameter of the opening 31 is smaller than a diameter of the main body 30 in which one of the arms (right arm) is accommodated. The end effector 18 is easy to be exposed from the opening 31. FIG. 2(B) is a front view of the bag 3 when seen from the opening 31. As illustrated in FIG. 2(B), binding parts 30a which are mutually bindable are formed in a circumferential edge of the opening 31. The binding parts 30a are a pair of strings provided at two separated locations on the circumferential edge. These strings are made of the same material as the main body 30 and integrally formed with the main body 30. By tying the pair of strings together, the opening 31 can be narrowed, while exposing the end effector 18 from the opening 31.

Figure 2C:
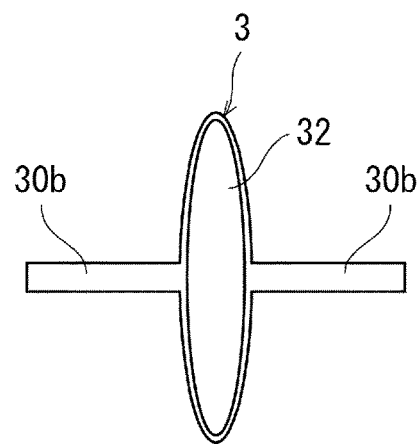
Figure 2D:
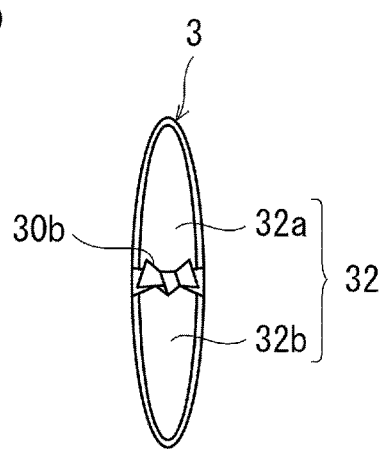

The opening 32 is formed at the other end of the cylindrical main body 30. The diameter of the opening 32 is about the same as the diameter of the main body 30 in which one of the arms (right arm) is accommodated. The opening 32 is constructed so that the other arm (left arm) 13 and the base 12 are exposed. FIG. 2(C) is a rear view of the bag 3 when seen from the opening 32. As illustrated in FIG. 2(C), binding parts 30b which are mutually bindable are formed in a circumferential edge of the opening 32. The binding parts 30b are a pair of strings provided at two separated locations on the circumferential edge. These strings are made of the same material as the main body 30 and integrally formed with the main body 30. By tying the pair of strings together, a first small opening 32a and a second small opening 32b are formed from the opening 32 (refer to FIG. 2(D)). The base shaft 16 (the torso part of the robot) on the base 12 can be exposed from the first small opening 32a, and the other arm 13 (left) can be exposed from the second small opening 32b. By tying the pair of strings together, the first small opening 32a and the second small opening 32b can be narrowed.

Figure 3:
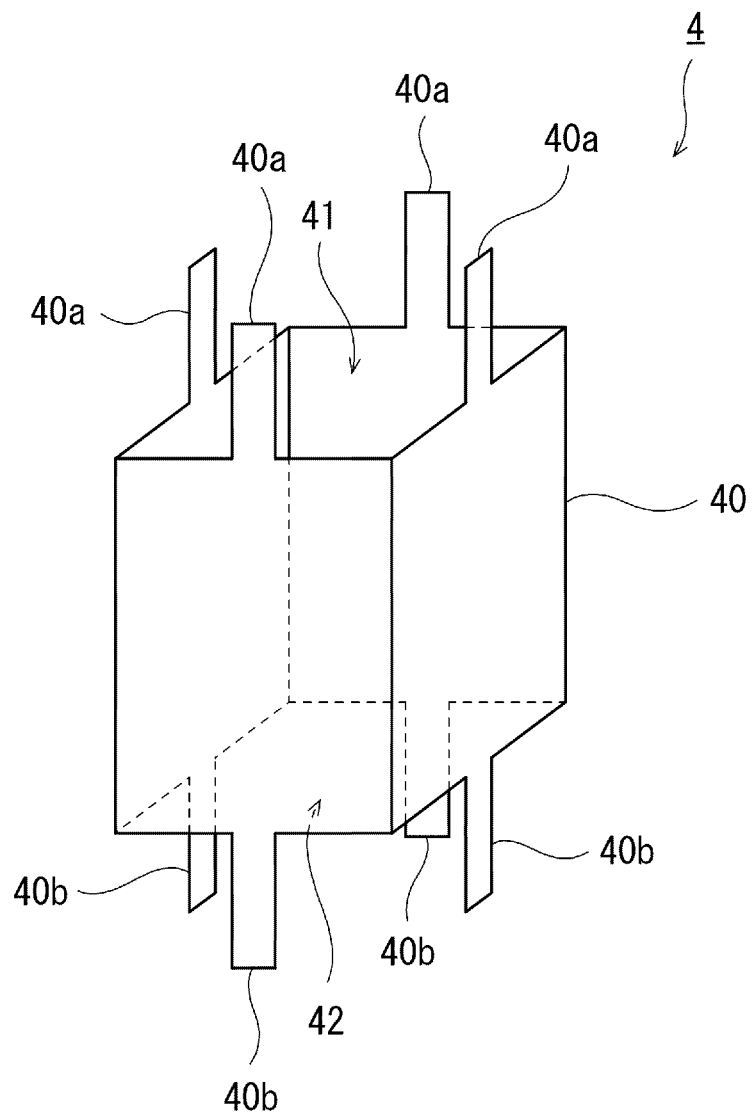
FIG. 3 is a perspective view illustrating a structure of a bag which accommodates a base of FIG. 1.

Moreover, the robot 11 has a bag 4 which accommodates the base 12. FIG. 3 is a perspective view illustrating the bag 4 of the base 12. As illustrated in FIG. 3, the bag 4 includes a square cylindrical shaped main body 40, an opening 41 formed in one end of the main body 40, and an opening 42 formed at the other end of the main body 40.

The main body 40 has the square cylindrical shape of which upper and lower surfaces are opened. The length in a long-side direction of one square shape is a dimension corresponding to the height of the base 12. The length in a short-side direction of one square shape is a dimension corresponding to the width of the base 12. The substantially rectangular parallelepiped base body 20 is accommodated in the main body 40 of the bag 4. The main body 40 is made of material having flexibility, such as polyethylene, polyvinyl chloride, polyolefin, etc. Since these materials are inexpensive, the bag can be thrown away after use. The bag 4 is colored in blue.

The opening 41 is formed in one end of the main body 40 of the bag 4. An upper part of the base body 20 is exposed from the square opening 41. Binding parts 40a which are mutually bindable are formed in respective sides of the square opening 41. Each binding part 40a is a string. The pair of strings provided to the two opposite sides have an equal length. By tying the strings of two opposite sides, the opening 41 can be narrowed, while the base shaft (the torso part of the robot) 16 located in the upper part of the base body 20 is exposed from the opening 41.

The opening 42 is formed at the other end of the main body 40 of the bag 4. The leg 21 of the base 12 is exposed from the square opening 42. Binding parts 40b which are mutually bindable are formed in respective sides of the square opening 42. Each binding part 40b is a string. The pair of strings provided to the two opposite sides have an equal length. By tying the strings of two opposite sides, the opening 42 can be narrowed, while the leg 21 of the base 12 is exposed from the opening 42.

Figure 4:
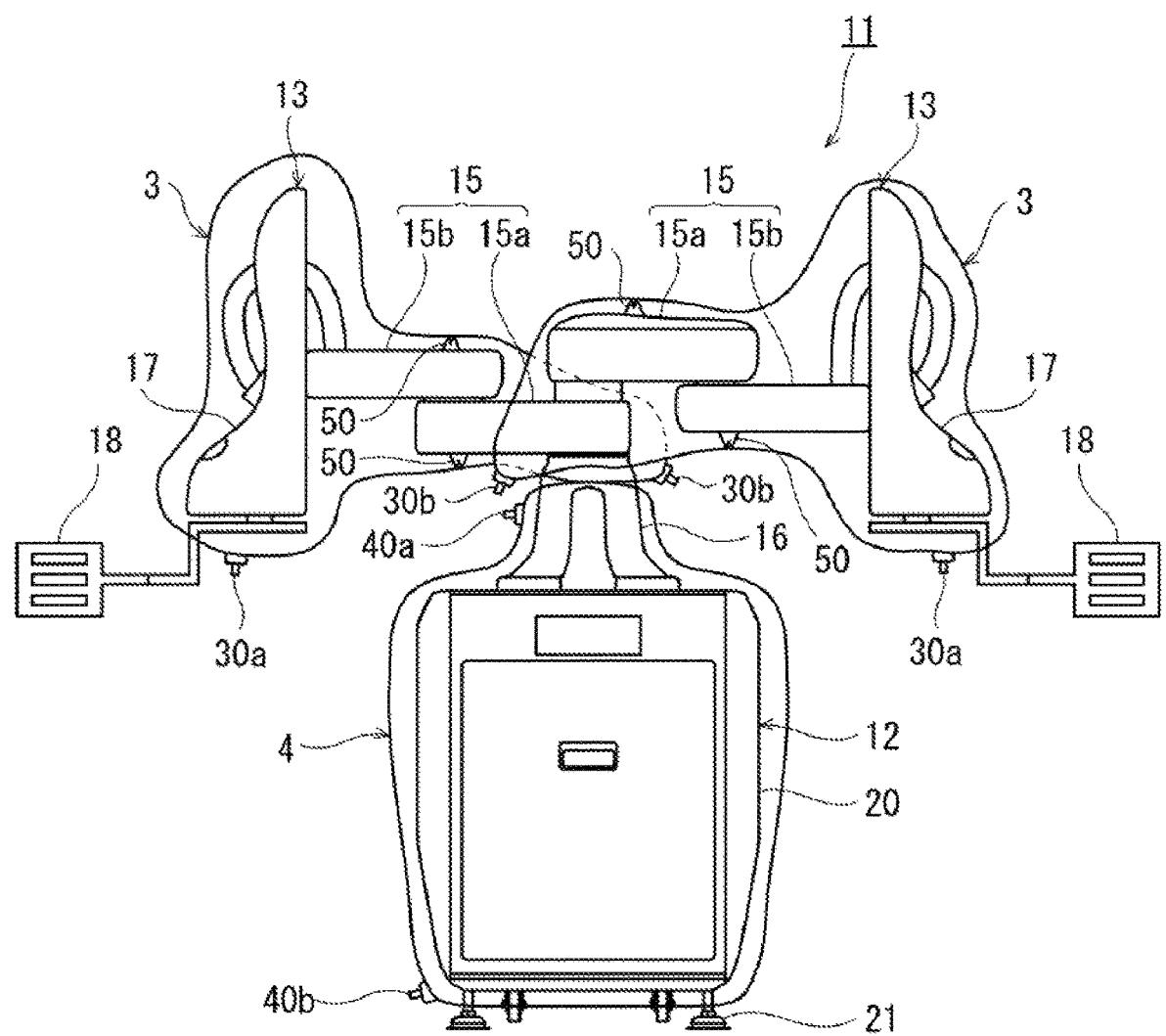
FIG. 4 is a front view of the robot equipped with the bags of FIGS. 2 and 3.
Figure 4:
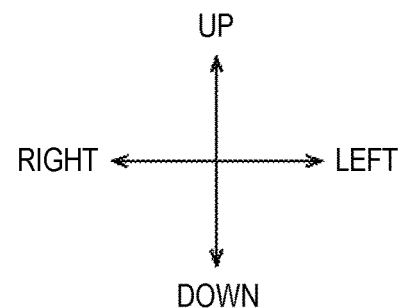

Next, one example of a method of fitting the bags 3 and 4 onto the robot 11 will be described. FIG. 4 is a front view of the robot 11 equipped with the bag 3 of FIGS. 2(A) to 2(D) and the bag 4 of FIG. 3. As illustrated in FIG. 4, the worker puts the bags 3 on the respective left and right arms 13. Then, in the opening 31 formed at one end of each bag 3, the pair of strings (binding parts 30a) are tied. Thus, the opening 31 is narrowed, while exposing the end effector 18. Next, in the opening 32 formed at the other end of each bag 3, the pair of strings (binding parts 30b) are tied. Thus, the first small opening 32a is narrowed, while exposing the base shaft 16 (the torso part of the robot) on the base 12 from the first small opening 32a. On the other hand, the second small opening 32b is narrowed, while exposing the other arm 13 from the second small opening 32b.

Moreover, the worker accommodates the main body 20 of the base 12 of the robot 11 in the bag 4. Then, in the opening 41 formed at one end of the bag 4, the strings (binding parts 40a) of the two opposite sides are tied. Thus, the opening 41 is narrowed, while exposing the base shaft 16 (the torso part of the robot) located in the upper part of the base body 20 from the opening 41. Then, in the opening 42 formed at the other end of the bag 4, the strings (binding parts 40b) of the two opposite sides are tied. Thus, the opening 42 is narrowed, while exposing the leg 21 of the base 12 from the opening 42.

Therefore, according to this embodiment, by covering the arms 13 with the bags 3 having flexibility (refer to FIG. 4), it can prevent that the scrap meat and the cleaning water infiltrate into the robot 11 from the arms 13 when processing meat at the food processing site. Moreover, since the robot 11 has the pair of arms 13, it can perform the work jointly in the same workspace with the worker (refer to FIGS. 1 and 4). Therefore, both the hygiene management and the productivity improvement can be achieved.

Moreover, by forming the opening 31 at one end of the bag 3 (refer to FIGS. 2(A) to 2(D)), the end effector 18 at the tip end of the arm 13 can be exposed from the opening 31. The washing of the end effector 18 becomes easier.

Moreover, by binding the binding parts 30b provided in a circumferential edge of the opening 32 formed in the other end of the bag 3, the first small opening 32a and the second small opening 32b can be formed (refer to FIGS. 2(A) to 2(D)), and the base 12 and the other arm 13 can be exposed.

Moreover, since the opening 42 is formed in the bag 4 which accommodates the main body 20 of the base 12 of the robot 11 (refer to FIG. 3), the legs 21 can be exposed from the opening 42. The washing of the leg 21 of the base 12 becomes easier.

Moreover, since the openings 31 and 32 of the bag 3 can be narrowed by the binding parts 30a and 30b provided to the circumferential edges of the openings 31 and 32 (refer to FIGS. 2(A) to 2(D)), it can prevent that foreign substance enters from gaps of the openings 31 and 32.

Moreover, since the openings 41 and 42 of the bag 4 can be narrowed by the binding parts 40a and 40b provided in a circumferential edge of the openings 41 and 42 (refer to FIG. 3), it can prevent that foreign substance enters from gaps of the openings 41 and 42.

Moreover, since the inexpensive material is used for the bags 3 and 4, and the bags have the simple structure, the bags 3 and 4 can be thrown away after use.

Moreover, although the binding parts 30a and 30b, and 40a and 40b are the pair of strings, they may be a hook-and-loop fastener or a zipper.

Figure 5:
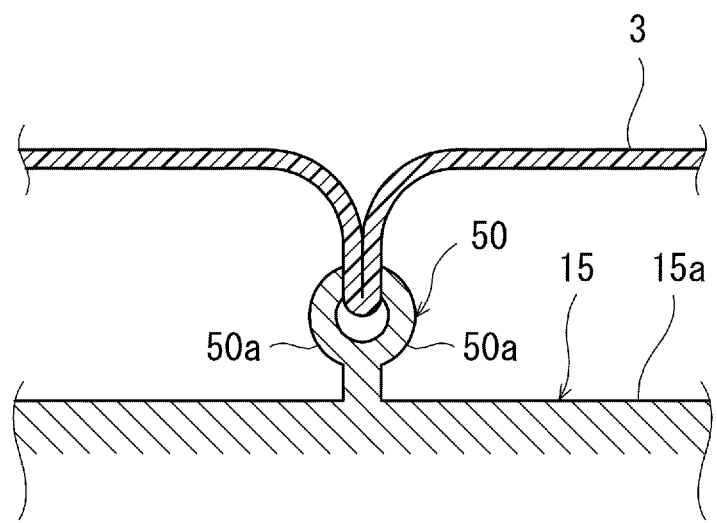
FIG. 5 is a cross-sectional view illustrating a bag gripper of FIG. 4.

Meanwhile, if the gap between the bag 3 and the arm 13 is large, the bag 3 may easily be damaged due to, for example, friction in association with the operation of the arm 13. Therefore, in this embodiment, a clip 50 (bag gripper) which grips the bag 3 from inside of the bag 3 is attached to each link which constitutes the arm 13 (refer to FIG. 4). FIG. 5 is a cross-sectional view illustrating the clip 50 attached to the surface of the first link 15a of the arm part 15 of FIG. 4. As illustrated in FIG. 5, the clip 50 is provided with a pair of grippers 50a which can grip the bag by a biasing force of a spring (not illustrated). Thus, the bag 3 can be gripped from inside. Therefore, since the bag 3 can be closely contacted to the arm 13, the bag 3 becomes difficult to be damaged. The clip may be a clothespin, which can grip the bag 3 by a biasing force. Attachment and detachment of the bag 3 become easier.

Moreover, since the bag gripper is directly attached to the arm 13 accommodated inside the bag 3, even if the bag gripper is broken, its fragments will not come out of the bag 3.

Moreover, the bag gripper is not limited to the structure which grips the bag 3 by the biasing force. The bag gripper may be, for example, a slot-like recess having a given width and a given depth. Since the bag 3 has flexibility, the bag 3 can be gripped from inside of the bag 3 by pushing in a part of the bag 3 into the slot-like recess with a constant force.

Moreover, since the bags 3 and 4 are colored in blue, even if the bags 3 and 4 are torn by the operation of the robot 11 and the torn fragments are mixed with food, they are easily found out visually. As long as the bags 3 and 4 are colored in a specific color, the color is not limited to blue. The color may be other colors, such as white, peach, or translucent.

Second Embodiment

Next, a second embodiment will be described. Below, description of the common structure to the first embodiment is omitted, and only different structures will be described.

Figure 6A:
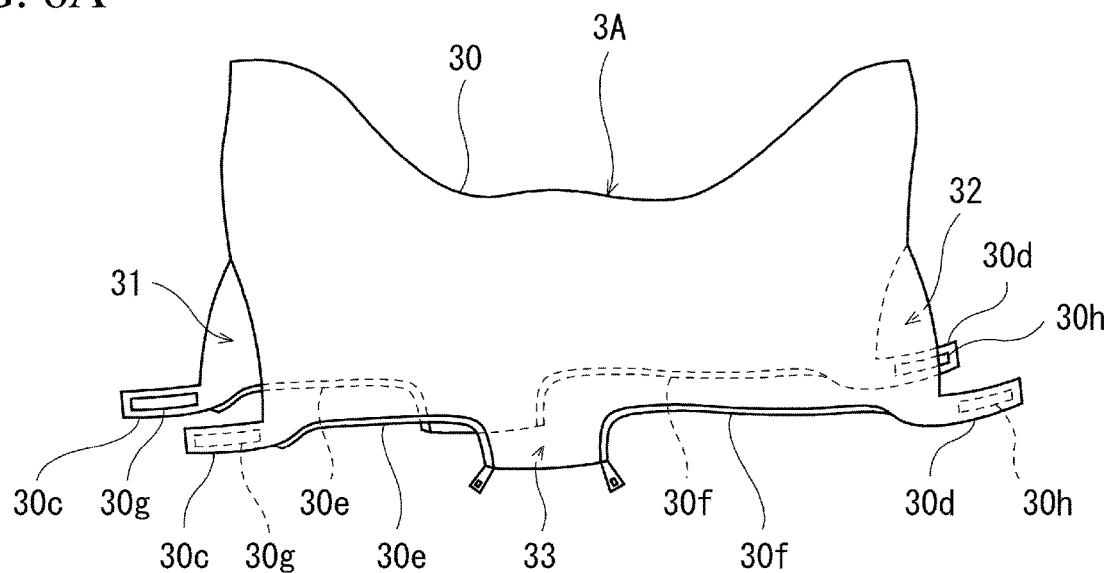
FIGS. 6(A) to 6(C) are views illustrating a structure of a bag which accommodates the robotic arm according to a second embodiment of the present disclosure.
Figure 6B:
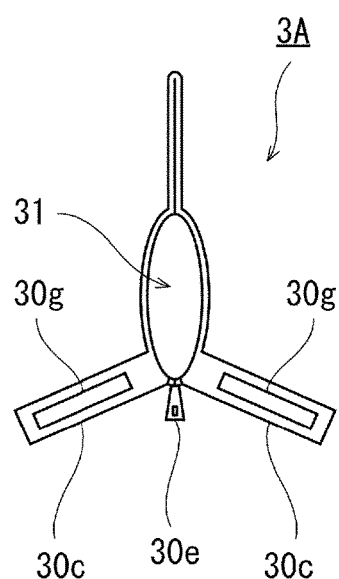
Figure 6C:
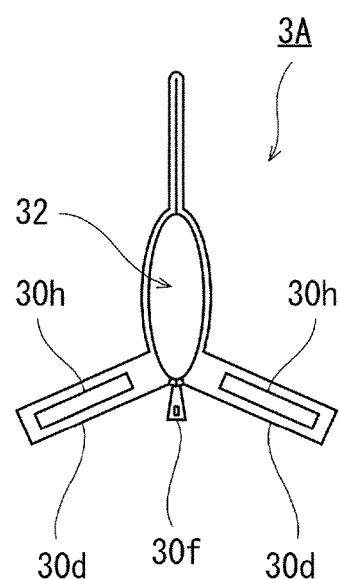

FIGS. 6(A) to 6(C) are views illustrating a structure of a bag according to the second embodiment of the present disclosure. FIG. 6(A) is a perspective view illustrating a structure of a bag 3A which accommodates the arm 13. As illustrated in FIG. 6(A), the bag 3A of this embodiment differs from the first embodiment (refer to FIGS. 2(A) to 2(D)) in that both the pair of arms 13 are accommodated. The bag 3A has a main body 30, an opening 31 formed at one end of the main body 30, and an opening 32 formed at the other end of the main body 30.

The main body 30 has a substantially rectangular shape. The main body 30 is formed by folding the substantially rectangular shape in the short-side direction. The length in the longitudinal direction of the main body 30 is a dimension corresponding to the length from one tip end to the other tip end when the pair of arms 13 are extended in a left-and-right direction. Both (left and right) arms 13 are accommodated in the main body 30.

Binding parts 30e are provided from one end in the longitudinal direction of the main body 30 to near the center. The binding parts 30e are a pair of fasteners. By mutually binding the pair of fasteners, the right arm 13 is accommodated in the main body 30, and the opening 31 is formed at one end of the main body 30. The end effector 18 at the tip end of one of the arms (right arm) 13 is exposed from the opening 31.

Binding parts 30f are provided from the other end in the longitudinal direction of the main body 30 to near the center. The binding parts 30f are a pair of fasteners. By mutually binding the pair of fasteners, the left arm 13 is accommodated in the main body 30, and the opening 32 is formed at the other end of the main body 30. The end effector 18 at the tip end of the other arm (left arm) 13 is exposed from the opening 32.

Moreover, the opening 33 is formed at the center of the main body 30 by mutually binding each of the binding parts 30e and 30f. The torso part (base shaft 16) of the robot 11 is exposed from the opening 33.

FIG. 6(B) is a front view of the bag 3A when seen from the opening 31. As illustrated in FIG. 6(B), binding parts 30c which are mutually bindable are formed in a circumferential edge of the opening 31 formed by binding the binding parts 30e (fasteners). The binding parts 30c are a pair of strings provided at two separated locations on the circumferential edge. A hook-and-loop fastener 30g is attached to the respective strings. By mutually binding the hook-and-loop fasteners 30g attached to the respective strings, the opening 31 can be narrowed, while exposing the end effector 18 at the tip end of one of the arms (right arm) 13 from the opening 31.

FIG. 6(C) is a rear view of the bag 3A when seen from the opening 32. As illustrated in FIG. 6(C), binding parts 30d which are mutually bindable are provided in a circumferential edge of the opening 32 formed by binding the binding parts 30f (fasteners). The binding parts 30d are a pair of strings provided at two separated locations on the circumferential edge. A hook-and-loop fastener 30h is attached to the respective strings. By mutually binding the hook-and-loop fasteners 30h attached to the respective strings, the opening 32 can be narrowed, while exposing the end effector 18 from the opening 32.

Figure 7:
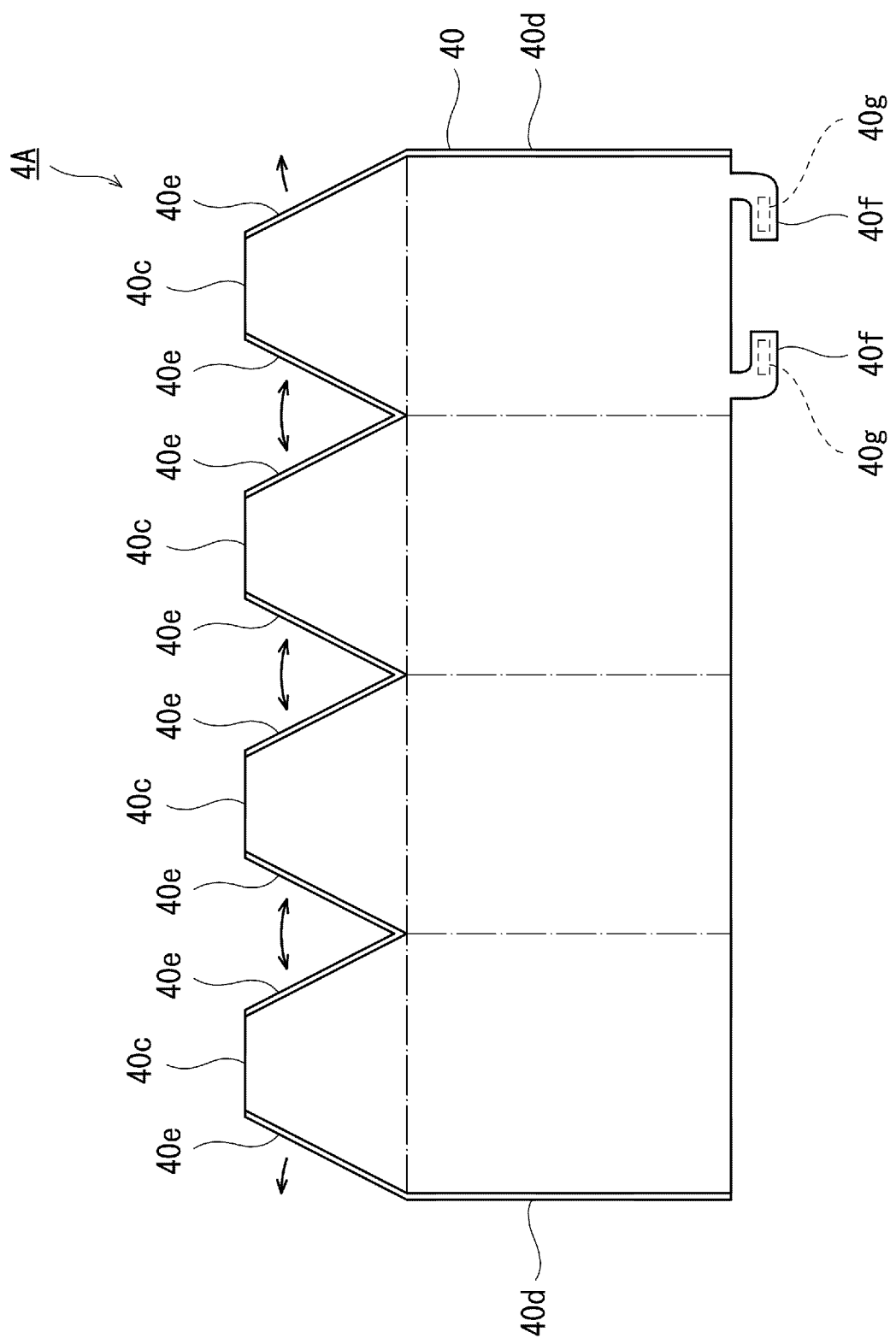
FIG. 7 is a developed view illustrating a structure of a bag which accommodates the base.

FIG. 7 is a developed view illustrating a structure of a bag 4A which accommodates the base 12. As illustrated in FIG. 7, the bag 4A has the main body 40 which is comprised of four quadrangles, and an upper surface part 40c which is comprised of four trapezoids.

The length in the longitudinal direction of the main body 40 is a dimension corresponding to four sides of the base 12. The length in the short-side direction of the main body 40 is a dimension corresponding to the height of the base 12. Binding parts 40d which are mutually bindable are provided along edges of two short sides of the main body 40. The binding parts 40d are fasteners. By mutually binding the fasteners, the substantially rectangular parallelepiped base body 20 is accommodated in the main body 40. Moreover, binding parts 40f which are mutually bindable are provided to an edge of a lower side of one of the quadrangles of the main body 40. The binding parts are a pair of strings. Hook-and-loop fasteners 40g are attached to the respective strings.

Binding parts 40e which are mutually bindable are provided to the respective sides of the adjacent upper surface parts 40c. The binding parts 40e are fasteners. By mutually binding the fasteners, the torso part (base shaft 16) of the robot is accommodated inside the upper surface part 40c.

Figure 8:
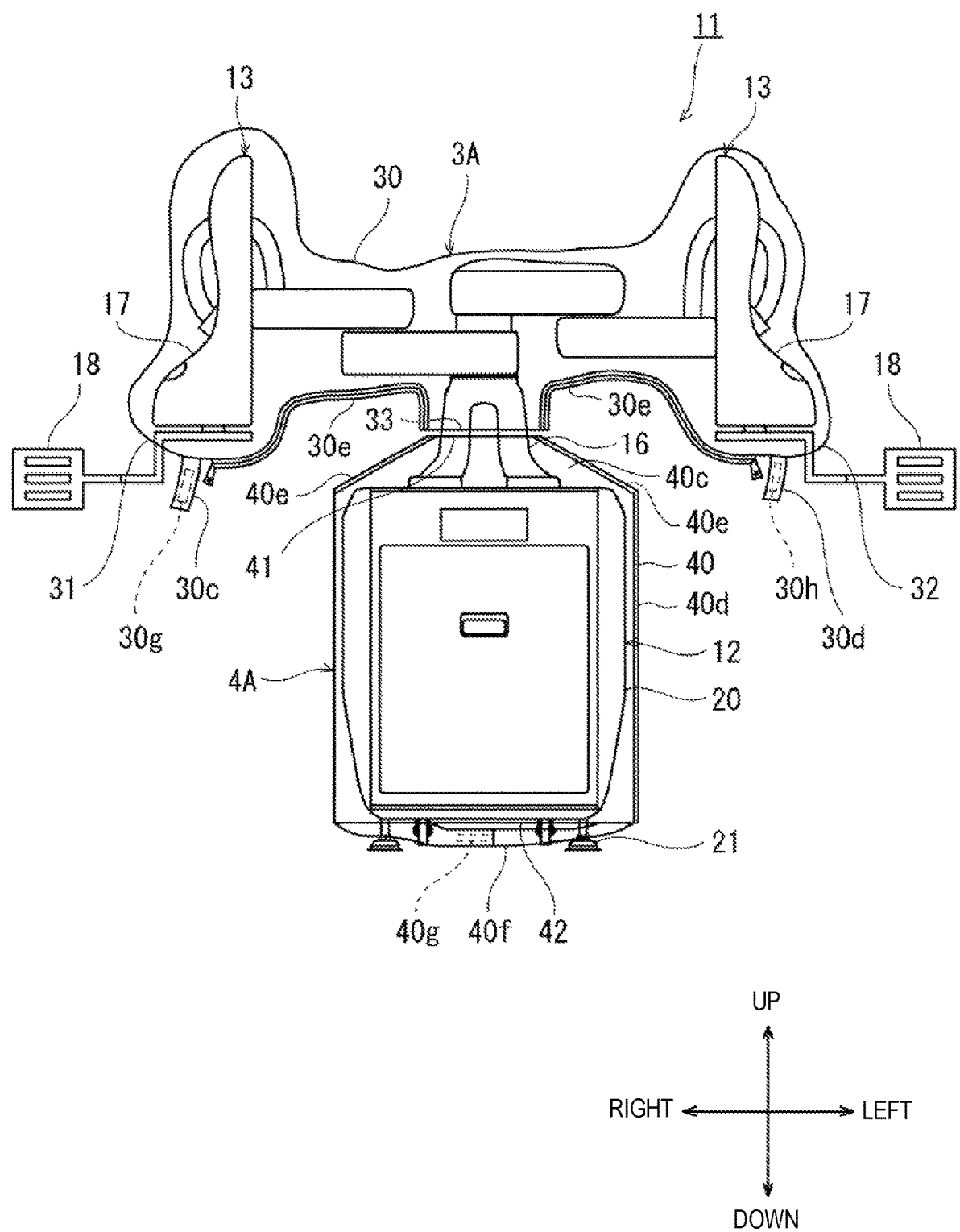
FIG. 8 is a front view of the robot equipped with the bags of FIGS. 6 and 7.

Next, one example of a method of fitting the bags 3A and 4A onto the robot 11 will be described. FIG. 8 is a front view of the robot 11 equipped with the bag 3A and the bag 4A. As illustrated in FIG. 8, the worker puts the bag 3A on both of the pair of arms 13. Then, the hook-and-loop fasteners 30g attached to the binding parts 30c of one opening 31 of the bag 3A are bound. Thus, the opening 31 can be narrowed, while exposing the end effector 18 at the tip end of one of the arms (right arm) 13 from the opening 31. At this time, by mutually binding the pair of fasteners (binding parts 30e) of the main body 30, the right arm 13 is accommodated in the main body 30.

Similarly, the hook-and-loop fasteners 30h attached to the binding parts 30d of the other opening 32 of the bag 3A are bound. Thus, the opening 32 can be narrowed, while exposing the end effector 18 at the tip end of the other arm (left arm) 13 from the opening 32. At this time, by mutually binding the pair of fasteners (binding parts 30e) of the main body 30, the left arm 13 is accommodated in the main body 30.

Next, the worker binds the fasteners (40d) of the main body 40 of the bag 4A. Thus, the base body 20 is accommodated in the main body 40. At this time, the leg 21 of the base 12 can be exposed from the opening 42 formed at the lower side of the main body 40. Further, the worker can close the opening 42 by binding the hook-and-loop fasteners 40g of the binding parts 40f located in the lower side of the main body 40. Next, the worker binds the fasteners (40e) of the upper surface part 40c of the main body 40. Thus, the torso part (base shaft 16) of the robot is accommodated inside the upper surface part 40c. At this time, a part of the torso part of the robot is exposed from the opening 41 formed in the upper surface part 40c.

According to this embodiment, since the hook-and-loop fasteners are used for the binding parts of the bags 3A and 4A, workability improves. The bags 3A and 4A are washable and suitable for reuse.

Other Embodiments

Note that, although the openings are formed beforehand at the ends of the bag of each embodiment, a perforated slit may be formed beforehand in the bag, and the worker separates the tip end of the bag from the main body along the slit to form the opening at one end of the bag.

Note that, although the robot 11 of the embodiments is the dual-arm robot having the pair of arms 13, the robot may include one arm 13, or three or more arms 13, which is/are accommodated in the bag 3.

Note that, although the robot 11 of the embodiments is introduced into the meat processing site, the site is not be limited to meat processing site, as long as it is a work site where the robot performs a work jointly with the worker within the same workspace.

Note that, in the embodiments, although the end effector 18 is the spatula for handling the processed meat, it is not limited to the spatula and may be a chuck, a suction head, a nozzle which discharges liquid, etc.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

The present disclosure is useful for the robot used in the food processing site etc. which requires the severe hygiene management.

DESCRIPTION OF REFERENCE CHARACTERS 3, 4 Bag
11 Robot
12 Base
13 Arm
15 Arm Part
17 Wrist Part
18 End Effector
30, 40 Main Body of Bag
30a, 30b, 40a, 40b Binding Part (String)
31, 32, 41, 42 Opening
50 Clip

The invention claimed is:

1. A robot, comprising:
a base;
a pair of robotic arms supported by the base; and
first and second bags configured to accommodate the respective robotic arms and having flexibility, wherein
the first bag includes
a main body configured to accommodate one of the robotic arms,
an opening formed at one end of the main body and configured to expose an end effector coupled to a tip end of the one robotic arm,
a first small opening formed at the other end of the main body and configured to expose the base, and
a second small opening formed at the other end of the main body and configured to expose the other robotic arm; and
the second bag includes
a main body configured to accommodate the other robotic arm,
an opening formed at one end of the main body of the second bag and configured to expose an end effector coupled to a tip end of the other robotic arm,
a first small opening formed at the other end of the main body of the second bag and configured to expose the base, and
a second small opening formed at the other end of the main body of the second bag and configured to expose the one robotic arm.

2. The robot of claim 1, wherein each of the first and second bags further includes:
an opening formed at the other end of the main body; and
mutually-bindable binding parts provided to two separated locations on a circumferential edge of the opening,
wherein the first small opening and the second small opening of the first bag are formed by mutually binding the binding parts of the first bag, and the first small opening and the second small opening of the second bag are formed by mutually binding the binding parts of the second bag.

3. The robot of claim 2, further comprising one or more bag grippers provided to one or more locations in at least one of the robotic arms and configured to grip at least one of the first and second bags from inside of the bag.

4. A bag used for the robot of claim 2.

5. The robot of claim 1, wherein the base includes a base body and a leg coupled to the base body, and
wherein the robot further includes a third bag having a main body configured to accommodate the base body and an opening formed so as to expose the leg.

6. The robot of claim 5, further comprising one or more bag grippers provided to one or more locations in at least one of the robotic arms and configured to grip at least one of the first, second and third bags from inside of the bag.

7. The robot of claim 1, wherein at least one of the first and second bags has at least one narrowing part formed in an edge of the corresponding opening to narrow the opening.

8. The robot of claim 7, further comprising one or more bag grippers provided to one or more locations in at least one of the robotic arms and configured to grip at least one of the first and second bags from inside of the bag.

9. The robot of claim 1, further comprising one or more bag grippers provided to one or more locations in at least one of the robotic arms and configured to grip at least one of the first and second bags from inside of the bag.

10. A bag used for the robot of claim 9.

11. The robot of claim 1, wherein at least one of the first and second bags is colored in a specific color.

12. The robot of claim 1, wherein at least one of the robotic arms has an articulated structure.

13. A bag used for the robot of claim 1.

14. A robot, comprising:
a base;
a pair of robotic arms supported by the base; and
a bag configured to accommodate the pair of robotic arms and having flexibility; and
end effectors coupled to tip ends of the respective robotic arms, wherein
the bag includes
a main body configured to accommodate both the robotic arms,
openings for hands formed at one end and the other end of the main body and configured to expose the end effectors,
an opening for a torso configured to expose a part of the base, and
fasteners provided between the opening for the torso and the openings for the hands in the main body and configured to be openable and closable.

15. The robot of claim 14, wherein:
the base includes a base body and a leg coupled to the base body; and
the robot further includes a bag having a main body configured to accommodate the base body and an opening formed so as to expose the leg.

16. The robot of claim 14, wherein the bag has at least one narrowing part formed in an edge of the corresponding opening to narrow the opening.

17. The robot of claim 14, further comprising one or more bag grippers provided to one or more locations in at least one of the robotic arms and configured to grip the bag from inside of the bag.

18. The robot of claim 14, wherein the bag is colored in a specific color.

19. The robot of claim 14, wherein at least one of the robotic arms has an articulated structure.

20. A bag used for the robot of claim 14.

* * * * *